(12) United States Patent
Massari et al.

(10) Patent No.: US 7,795,352 B2
(45) Date of Patent: Sep. 14, 2010

(54) POLYOLEFINIC COMPOSITIONS HAVING GOOD WHITENING RESISTANCE

(75) Inventors: Paola Massari, Ferrara (IT); Marco Ciarafoni, Ferrara (IT); Jean News, Newark, DE (US)

(73) Assignee: Basell Poliolefine Italia s.r.l., Milan (IT)

( * ) Notice: Subject to any disclaimer, the term of this patent is extended or adjusted under 35 U.S.C. 154(b) by 271 days.

(21) Appl. No.: 11/793,843

(22) PCT Filed: Nov. 28, 2005

(86) PCT No.: PCT/EP2005/056264

§ 371 (c)(1), (2), (4) Date: Jun. 22, 2007

(87) PCT Pub. No.: WO2006/067023

PCT Pub. Date: Jun. 29, 2006

(65) Prior Publication Data

US 2008/0167428 A1    Jul. 10, 2008

Related U.S. Application Data

(60) Provisional application No. 60/657,671, filed on Mar. 2, 2005.

(30) Foreign Application Priority Data

Dec. 23, 2004    (EP) .................... 04030607

(51) Int. Cl.
C08L 23/00 (2006.01)
C08L 23/04 (2006.01)
C08F 8/00 (2006.01)

(52) U.S. Cl. .................... 525/240; 525/191

(58) Field of Classification Search .......... 525/240, 525/191
See application file for complete search history.

(56) References Cited

U.S. PATENT DOCUMENTS

| | | | |
|---|---|---|---|
| 4,245,062 A * | 1/1981 | Suzuki et al. | 525/323 |
| 4,298,718 A | 11/1981 | Mayr et al. | |
| 4,395,519 A * | 7/1983 | Minami et al. | 525/240 |
| 4,399,054 A | 8/1983 | Ferraris et al. | |
| 4,469,648 A | 9/1984 | Ferraris et al. | |
| 4,472,524 A | 9/1984 | Albizzati | |
| 4,473,687 A * | 9/1984 | Dorrer et al. | 525/240 |
| 4,495,338 A | 1/1985 | Mayr et al. | |
| 4,521,566 A | 6/1985 | Galli et al. | |
| 4,522,930 A | 6/1985 | Albizzati et al. | |
| 4,582,878 A * | 4/1986 | Chiba et al. | 525/268 |
| 4,734,459 A | 3/1988 | Cecchin et al. | |
| 4,950,720 A * | 8/1990 | Randall et al. | 525/322 |
| 5,286,552 A * | 2/1994 | Lesca et al. | 428/220 |
| 5,298,561 A * | 3/1994 | Cecchin et al. | 525/240 |
| 5,302,454 A * | 4/1994 | Cecchin et al. | 428/402 |
| 5,541,260 A * | 7/1996 | Pelliconi et al. | 525/240 |
| 5,969,049 A * | 10/1999 | Ueda et al. | 525/247 |
| 6,156,846 A * | 12/2000 | Tsuruoka et al. | 525/240 |
| 6,355,731 B1 * | 3/2002 | Govoni et al. | 525/191 |
| 6,403,708 B2 * | 6/2002 | Moriya et al. | 525/88 |
| 6,673,869 B2 * | 1/2004 | Silvestri et al. | 525/191 |
| 6,716,939 B2 | 4/2004 | Morini et al. | |
| 6,818,583 B1 | 11/2004 | Morini et al. | |
| 2002/0037979 A1 * | 3/2002 | Job et al. | 526/119 |

FOREIGN PATENT DOCUMENTS

| | | |
|---|---|---|
| EP | 45977 | 2/1982 |
| EP | 86300 | 8/1983 |
| EP | 361493 | 4/1990 |
| EP | 444671 | 9/1991 |
| EP | 728769 | 8/1996 |
| EP | 903356 | 3/1999 |
| GB | 1065568 | 4/1967 |

(Continued)

OTHER PUBLICATIONS

Y. Inoue et al., "Studies of the stereospecific polymerization mechanism of propylene by a modified Ziegler-Natta catalyst based on 125 MHz $^{13}$C n.m.r. spectra," *Polymer*, vol. 25, p. 1640-1644 (1984).

(Continued)

*Primary Examiner*—Vasu Jagannathan
*Assistant Examiner*—Irina Krylova
(74) *Attorney, Agent, or Firm*—William R. Reid

(57) ABSTRACT

A polypropylene composition comprising (percent by weight)
(a) 50-77% of a crystalline propylene polymer having an amount of isotactic pentads (mmmm), measured by $^{13}$C-MNR on the fraction insoluble in xylene at 25° C., higher than 97.5 molar % and a polydispersity index ranging from 4 to 10;
(b) 13-28% of an elastomeric copolymer of ethylene and propylene, the copolymer having an amount of recurring units deriving from ethylene ranging from 30 to 70% and being partially soluble in xylene at ambient temperature, the polymer fraction soluble in xylene at ambient temperature having an intrinsic viscosity value ranging from 2 to 4 dl/g; and
(c) 10-22% of polyethylene having an intrinsic viscosity value ranging from 1 to 3 dl/g, in said composition component (b) plus component (c) being in amounts of at least 25 wt %. The polymer composition exhibits good impact resistant, whitening resistance and relatively low stiffness.

8 Claims, No Drawings

FOREIGN PATENT DOCUMENTS

| | | |
|---|---|---|
| JP | 58 152038 | 9/1983 |
| WO | 00/63261 | 10/2000 |
| WO | 01/57099 | 8/2001 |
| WO | 2006/125720 | 11/2006 |

OTHER PUBLICATIONS

R. Chûjô et al., "Two-site model analysis of $^{13}$C n.m.r. of polypropylene polymerized by Ziegler-Natta catalysts with external alkoxyilane donors," *Polymer*, vol. 35(2), p. 339-342 (1994).

* cited by examiner

POLYOLEFINIC COMPOSITIONS HAVING GOOD WHITENING RESISTANCE

This application is the U.S. national phase of International Application Number PCT/EP2005/056264, filed Nov. 28, 2005, claiming priority to European Patent Application 04030607.8 filed Dec. 23, 2004, and the benefit under 35 U.S.C. 119(e) of U.S. Provisional Application No. 60/657,671, filed Mar. 2, 2005; the disclosures of International Application PCT/EP2005/056264, European Patent Application 04030607.8 and U.S. Provisional Application No. 60/657,671, each as filed, are incorporated herein by reference.

The present invention relates to polyolefin compositions having good whitening resistance characteristics and impact resistance.

The polyolefin compositions according to the present invention find application in automotive field, in particular as bumpers and interior trims, luggage and house ware.

As it is known, the isotactic polypropylene, though being endowed with an exceptional combination of excellent properties, is affected by the drawback of possessing an insufficient impact resistance at relatively low temperatures.

According to the teaching of the prior art, it is possible to obviate the said drawback and maintain whitening resistance, without sensibly affecting the other polymer properties, by properly adding rubbers and polyethylene to the polypropylene.

For example, the U.S. Pat. No. 4,245,062 discloses a process for producing a blend of polypropylene and two different propylene-ethylene copolymers, one of said copolymers substantially forming the rubbery phase. The propylene polymers thus obtained have good impact resistance at low temperature.

European patent application 86300 relates to so called "impact polypropylene compositions" and discloses polypropylene block copolymers having improved impact resistance and high stiffness.

In U.S. Pat. No. 4,521,566 a polypropylene composition is disclosed having the following composition:
  74 to 91% of crystalline isotactic polypropylene,
  6.7 to 19% of an amorphous copolymeric fraction of ethylene and propylene and
  1.5 to 8.5% of crystalline polyethylene containing from 50 to 98 wt % of ethylene and exhibiting a crystalline of polyethylene type.

The said composition exhibits quite high stiffness and good impact resistance but resistance at whitening is not as high as desired.

The U.S. Pat. No. 4,473,687 discloses polypropylene molding compositions of polypropylene, ethylene-propylene copolymer and polyethylene in different proportions, said composition having high hardness and increased impact strength.

In U.S. Pat. No. 4,734,459 a polypropylene composition having good whitening resistance is disclosed. According to the teaching of the said prior art document, it is possible to improve whitening resistance by replacing the ethylene-propylene copolymer rubber with an ethylene-butene-1 copolymer rubber.

It has now surprisingly been found that it is possible to obtain polypropylene compositions simultaneously endowed with relatively low stiffness, high impact resistance and high whitening resistance by producing a polypropylene composition having a different ratio between the polymer components that exhibit specific characteristics.

Thus, an embodiment of the present invention consists of a polypropylene composition comprising (percent by weight):
  a) 50-77%, preferably 50 to less than 70%, of a crystalline propylene polymer having an amount of isotactic pentads (mmmm), measured by $^{13}$C-MNR on the fraction insoluble in xylene at 25° C., higher than 97.5 molar % and a polydispersity index ranging from 4 to 10, preferably from 5 to 10, more preferably from 5.5 to 10;

b) 13-28%, preferably higher than 15 to 28%, of an elastomeric copolymer of ethylene and propylene, the copolymer having an amount of recurring units deriving from ethylene ranging from 30 to 70%, preferably 35 to 60%, and being partially soluble in xylene at ambient temperature, the polymer fraction soluble in xylene at ambient temperature having an intrinsic viscosity value ranging from 2 to 4 dl/g; and c) 10-22%, preferably 10 to 20%, of polyethylene having an intrinsic viscosity value ranging from 1 to 3 dl/g and optionally containing recurring units deriving from propylene in amounts up to less than 10%.

The term "copolymer" as used herein refers to both polymers with two different recurring units and to polymers with more than two different recurring units, such as terpolymers, in the chain. By "ambient temperature" is meant therein a temperature of about 25° C. By "crystalline propylene polymer" is meant in present application a propylene polymer having an amount of isotactic pentads (mmmm), measured by $^{13}$C-MNR on the fraction insoluble in xylene at 25° C., higher than 70 molar %; by "elastomeric" polymer is meant a polymer having solubility in xylene at ambient temperature higher than 50 wt %.

The composition typically has a content of component (b) plus component (c) in amounts of at least 25 wt %, preferably higher than 30 wt %, and the total content of copolymerized ethylene is at least 17 wt %, preferably is equal to or higher than 20 wt %.

The composition typically has a value of melt flow rate ranging from 10 to 30, preferably 10 to 20, g/10 min.

The composition has typically an amount of elastomeric copolymer (b) equal to or higher than polyethylene (c), preferably the weight ratio between copolymer (b) and polyethylene (c) is at least 1.2.

Typically, the composition of the present invention exhibits a flexural modulus value of at least 800 MPa, preferably from 850 to 1250 MPa, stress-whitening resistance values corresponding to a diameter of the whitened area of at most 1.50 cm caused by a ram falling from a 30 cm height and a diameter of the whitened area of at most 0.80 cm caused by a ram falling from a 5 cm height, a value of Izod impact resistance at 23° C. of more than 16 kJ/m$^2$ and the one at 0° C. of more than 10 kJ/m$^2$.

Crystalline propylene polymer (a) is selected from a propylene homopolymer and a copolymer of propylene containing at most 3 wt % of ethylene or of a $C_4$-$C_{10}$ α-olefin or of combination thereof. Particularly preferred is the propylene homopolymer.

Typically crystalline propylene polymer (a) shows a molecular weight distribution, expressed by the ratio between the weight average molecular weight and numeric average molecular weight, i.e. $\overline{M_w}/\overline{M_n}$, measured by GPC, equal to or higher than 7.5, in particular from 8 to 20, more preferably from 12 to 18.

Typically crystalline propylene polymer (a) shows a value of z average molecular weight to numeric average molecular weight ratio, i.e. $\overline{M_z}/\overline{M_w}$, measured by GPC, of at least 3.5, preferably 3.5 to 9.

Elastomeric ethylene-propylene copolymer (b) can optionally comprise a diene. When present, the diene is typically in amounts ranging from 0.5 to 10 wt % with respect to the weight of copolymer (b). The diene can be conjugated or not and is selected from butadiene, 1,4-hexadiene, 1,5-hexadiene, and ethylidene-norbornene-1, for example.

Copolymer (b) exhibits a fraction insoluble in xylene at ambient temperature that is typically in amounts of less than 45 wt %, preferably up to 20 wt %. The xylene-insoluble polymer fraction of copolymer (b) is reach in ethylene; the amount of ethylene is typically higher than 55 wt %.

Polyethylene (c) is crystalline or semicrystalline and is selected from ethylene homopolymer or an ethylene-propylene copolymer having the average content of the comonomer in amounts lower than 10 wt %. The intrinsic viscosity values of copolymer (c) are preferably within the range from 1.2 to 2 dl/g.

The composition of the present invention is obtained by means of a sequential copolymerization process.

Therefore, the present invention is further directed to a process for the preparation of the polyolefin compositions as reported above, said process comprising at least three sequential polymerization stages with each subsequent polymerization stage being conducted in the presence of the polymeric material formed in the immediately preceding polymerization reaction, wherein the polymerization stage of propylene to the crystalline polymer (a) is carried out in at least one stage, than a copolymerization stage of mixtures of ethylene with propylene (and optionally a diene) to the elastomeric polymer (b) and finally a polymerization stage of ethylene to polyethylene (c) are carried out. The polymerisation stages may be carried out in the presence of a stereospecific Ziegler-Natta catalyst. According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:

a) Mg, Ti and halogen and an electron donor (internal donor), b) an alkylaluminum compound and, optionally (but preferably), c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

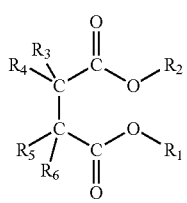

Among succinates, they are preferably selected from succinates of formula (I) below: wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms; or of formula (II) below:

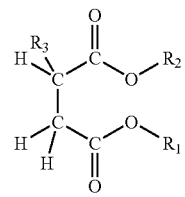

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The external donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

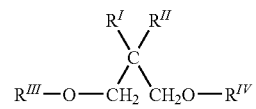

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7 R_b^8 Si (OR^9)_c$, where a and b are integers from 0 to 2, c is an integer from 1 to 3 and the sum (a+b+c) is 4; $R^7$, $R^8$, and $R^9$, are $C_1$-$C_{18}$ hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl.

Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl)(methyl) Si(OCH$_3$)$_2$, (phenyl)$_2$Si(OCH$_3$)$_2$ and (cyclopentyl)$_2$Si(OCH$_3$)$_2$.

Preferably the electron donor compound (c) is used in such an amount to give a molar ratio between the organoaluminum compound and said electron donor compound (c) of from 0.1 to 500, more preferably from 1 to 300 and in partcular from 3 to 100.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably MgCl$_2$ in active form, which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are TiCl$_4$ and TiCl$_3$; furthermore, also Ti-haloalcoholates of formula Ti(OR)n-yXy can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)n-yXy, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compound(s) can be added during the treatment with TiCl$_4$.

Regardless of the preparation method used, the final amount of the electron donor compound(s) is preferably such that the molar ratio with respect to the MgCl$_2$ is from 0.01 to 1, more preferably from 0.05 to 0.5.

The said catalyst components and catalysts are described in WO 00/63261 and WO 01/57099.

The catalysts may be pre-contacted with small quantities of olefin (pre-polymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

The polymerisation stages may occur in liquid phase, in gas phase or liquid-gas phase. Preferably, the polymerisation of crystalline polymer (a) is carried out in liquid monomer (e.g. using liquid propylene as diluent), while the copolymerisation stages of elastomeric copolymer (b) and polyethylene (c) are carried out in gas phase. Alternatively, all the three sequential polymerisation stages can be carried out in gas phase.

The reaction temperature in the polymerisation stage for the preparation of crystalline polymer (a) and in the preparation of the elastomeric copolymer (b) and polyethylene (c) in be the same or different, and is preferably from 40 to 100° C.; more preferably, the reaction temperature ranges from 50 to 80° C. in the preparation of polymer (a), and from 70 to 100° C. for the preparation of polymer components (b) and (c).

The pressure of the polymerisation stage to prepare polymer (a), if carried out in liquid monomer, is the one which competes with the vapour pressure of the liquid propylene at the operating temperature used, and it may be modified by the vapour pressure of the small quantity of inert diluent used to feed the catalyst mixture, by the overpressure of optional monomers and by the hydrogen used as molecular weight regulator. The polymerisation pressure preferably ranges from 33 to 43 bar, if done in liquid phase, and from 5 to 30 bar if done in gas phase. The residence times relative to the two stages depend on the desired ratio between polymers (a) and (b) and (c), and can usually range from 15 minutes to 8 hours. Conventional molecular weight regulators known in the art, such as chain transfer agents (e.g. hydrogen or ZnEt$_2$), may be used.

Conventional additives, fillers and pigments, commonly used in olefin polymers, may be added, such as nucleating agents, extension oils, mineral fillers, and other organic and inorganic pigments. In particular, the addition of inorganic fillers, such as talc, calcium carbonate and mineral fillers, also brings about an improvement of some mechanical properties, such as flexural modulus and HDT. Talc can also have a nucleating effect.

The nucleating agents are preferably added to the compositions of the present invention in quantities ranging from 0.05 to 2% by weight, more preferably from 0.1 to 1% by weight with respect to the total weight.

The particulars are given in the following examples, which are given to illustrate, without limiting, the present invention.

The following analytical methods have been used to determine the properties reported in the detailed description and in the examples.

Ethylene: By IR spectroscopy.

Fractions soluble and insoluble in xylene at 25° C.: 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.).

Intrinsic Viscosity [η]: Measured in tetrahydronaphthalene at 135° C.

Molecular weight ($\overline{M}n$, $\overline{M}_w$, $\overline{M}_z$): Measured by way of gel permeation chromatography (GPC) in 1,2,4-trichlorobenzene.

Determination of isotactic pentads content: 50 mg of each xylene insoluble fraction were dissolved in 0.5 mL of $C_2D_2Cl_4$. The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference. The microstructure analysis was carried out as described in literature (Polymer, 1984, 25, 1640, by Inoue Y. et Al. and Polymer, 1994, 35, 339, by Chujo R. et Al.).

Polydispersity index: Measurement of molecular weight distribution of the polymer. To determine the PI value, the modulus separation at loss modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G'=500 \text{ Pa})/(\text{frequency at } G''=500 \text{ Pa})$$

wherein G' is the storage modulus and G" is the loss modulus.

Melt flow rate: Determined according to ISO method 1133 (230° C. and 2.16 kg).

Flexural modulus: Determined according to ISO method 178.

Izod impact resistance: Determined according to ISO method 180/1A.

Break Energy: Determined according to the internal MA 17324 method. The same test specimens and testing method as for the determination of the ductile/brittle transition temperature (hereinafter described) are used but in the present case the energy required to, break the sample at −20° C. is determined.

Stress-whitening resistance: The resistance to whitening is determined by subjecting to the impact of a ram having a pre-established weight small discs prepared from the polymer being tested. Both the minimum height (h) up to the maximum height allowed by the apparatus necessary to obtain whitening, and the width (diameter) of the whitened area are recorded.

EXAMPLES 1-3

In a plant operating continuously according to the mixed liquid-gas polymerization technique, runs were carried out under the conditions specified in Table 1.

The polymerization was carried out in the presence of a catalyst system in a series of three reactors equipped with devices to transfer the product from one reactor to the one immediately next to it.

Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2.1.9C_2H_5OH$ (prepared according to the method described in ex. 2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

Catalyst System and Pre-Polymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to pre-polymerization by maintaining it in suspension in liquid propylene at 20° C. for about 5 minutes before introducing it into the first polymerization reactor.

Polymerization

The polymerisation run is conducted in continuous in a series of three reactors equipped with devices to transfer the product from one reactor to the one immediately next to it. The first reactor is a liquid phase reactor, and the second and third reactors are fluid bed gas phase reactors. Polymer (a) is prepared in the first reactor, while polymers (b) and (c) are prepared in the second and third reactor, respectively. Temperature and pressure are maintained constant throughout the course of the reaction. Hydrogen is used as molecular weight regulator. The gas phase (propylene, ethylene and hydrogen) is continuously analysed via gas-chromatography. At the end of the run the powder is discharged and dried under a nitrogen flow. Then the polymer particles are introduced in an extrusion, wherein they are mixed with 8500 ppm of talc, 1500 ppm of Irganox B 215 (made of 1 part of Irganox 1010 and 2 parts of Irgafos 168) and 500 ppm of Ca stearate, to obtain a nucleated composition. The previously said Irganox 1010 is pentaerytrityl tetrakis 3-(3,5-di-tert-butyl-4-hydroxyphenyl) propanoate, while Irgafos 168 is tris (2,4-di-tert-butylphenyl) phosphite, booh marketed by Ciba-Geigy. The polymer particles are extruded under nitrogen atmosphere in a twin screw extruder, at a rotation speed of 250 rpm and a melt temperature of 200-250° C.

EXAMPLE 4

Example 1 was repeated except that the catalyst component was replaced with a catalyst component containing diisobutylphthalate in the place of diethyl 2,3-(diisopropyl)succinate and the crystalline homopolymer was produced in two stages. Both stages were carried out in a liquid phase reactor.

COMPARATIVE EXAMPLE 1

1 c

Example 4 was repeated except that no polymerization was carried out in the second liquid phase reactor no polymerization of ethylene to crystalline polyethylene was carried out, but the elastomeric ethylene-propylene copolymer rubber was produced in both the first and second gas phase reactor.

COMPARATIVE EXAMPLE 2

2c

Example 4 was repeated except that no polymerization of ethylene to crystalline polyethylene was carried out, but the elastomeric ethylene-propylene copolymer rubber was produced in both the first and second gas phase reactor.

In Tables 1 to 4 the polymerization conditions, features and properties of the compositions are recorded.

TABLE 1

| | \multicolumn{6}{c}{Polymerization Process} |
|---|---|---|---|---|---|---|
| | \multicolumn{6}{c}{Example} |
| | 1 | 2 | 3 | 4 | 1c | 2c |
| TEAL/solid catalyst component weight ratio | 9 | 16 | 9 | 13 | 10 | 9 |
| TEAL/DCPMS weight ratio | 4 | 5 | 6 | 2.7 | 5 | 2.3 |
| \multicolumn{7}{c}{$1^{st}$ liquid phase reactor} |
| Polymerisation temperature, °C. | 69 | 68 | 70 | 67 | 70 | 67 |
| Pressure, bar | 39 | 39 | 39 | 41 | 39.5 | 40 |
| Residence time, min | 59 | 50 | 63 | 52 | 62 | 32 |
| $H_2$ bulk, mol ppm | 7,400 | 9,600 | 6,900 | 7,980 | 6,700 | 10,000 |
| \multicolumn{7}{c}{$2^{nd}$ liquid phase reactor} |
| Polymerisation temperature, °C. | — | — | — | 67 | — | 67 |
| Pressure, bar | — | — | — | 41 | — | 40 |
| Residence time, min | — | — | — | 35 | — | 26 |
| $H_2$ bulk, mol ppm | — | — | — | 7,300 | — | 9,800 |
| \multicolumn{7}{c}{$1^{st}$ gas phase reactor} |
| Polymerisation temperature, °C. | 80 | 80 | 80 | 85 | 80 | 80 |
| Pressure, bar | 16 | 16 | 17 | 15 | 15 | 15 |
| Residence time, min | 33 | 23 | 18 | 24 | 15 | 13 |
| $C_2^-/(C_2^- + C_3^-)$, % | 0.23 | 0.24 | 0.27 | 0.29 | 0.36 | 0.23 |
| $H_2/C_2^-$, % | 0.069 | 0.046 | 0.049 | 0.071 | 0.053 | 0.055 |
| \multicolumn{7}{c}{$2^{ns}$ gas phase reactor} |
| Polymerisation temperature, °C. | 83 | 85 | 100 | 90 | 80 | 80 |
| Pressure, bar | 17 | 18 | 15 | 12 | 20.8 | 19 |
| Residence time, min | 37 | 33 | 14 | 22 | 27 | 23 |
| $C_2^-/(C_2^- + C_3^-)$, % | 0.98 | 0.98 | 0.99 | 0.99 | 0.36 | 0.23 |
| $H_2/C_2^-$, % | 0.65 | 0.695 | 0.297 | 0.4 | 0.050 | 0.053 |

Notes:

$H_2$ bulk = hydrogen concentration in the liquid monomer;

$C_2^-$ = ethylene;

$C_3^-$ = propylene.

The amounts of components (a) to (c) in the thus obtained polymer compositions and features of each component are specified in Table 2.

TABLE 2

Composition Analysis

| | Example | | | | | |
|---|---|---|---|---|---|---|
| | 1 | 2 | 3 | 4 | 1c | 2c |
| Crystalline propylene homopolymer | | | | | | |
| Homopolymer content, wt % | 61.7 | 64.2 | 61 | 63 | 68 | 70 |
| MFR, g/10 min | 59 | 71 | 71 | 53 | 69 | 80 |
| Polydispersity Index | 5.7 | 5.7 | 5.7 | 4.9 | 5 | 5.7 |
| $\overline{M}_w/\overline{M}_n$ ratio | 15.3 | 15.3 | 15.3 | 10.4 | 8.9 | 10.9 |
| $\overline{M}_z/\overline{M}_w$ ratio | 7.3 | 7.3 | 7.3 | 4.2 | 4.4 | 7.7 |
| Pentad content, molar % | 98.4 | 98.4 | 98.4 | 98.4 | 98.6 | 98 |
| Xylene soluble fraction, wt % | 2 | 2 | 2 | 1.9 | 2.0 | 2.5 |
| Proylene-ethylene copolymer | | | | | | |
| Copolymer content, wt % | 23.3 | 23.7 | 23 | 23 | 32 | 30 |
| Ethylene content in EPR, wt % | 39 | 39 | 40 | 40 | 47 | 42 |
| Intrinsic viscosity [η] of xylene-soluble fraction13, dl/g | 2.5[1] | 2.9[1] | 3.1[1] | 3.1[1] | 2.98[2] | 2.96[2] |
| Xylene soluble fraction, wt % | 25.7[1] | 25.3[1] | 25.7[1] | 25.7[1] | — | — |
| Polyethylene | | | | | | |
| Polyethylene content, wt % | 15 | 12.1 | 16 | 13 | 0 | 0 |
| Ethylene content in PE, wt % | 100 | 100 | 100 | 100 | — | — |
| Intrinsic viscosity [η], dl/g | 1.65 | 1.67 | — | 1.75 | — | — |

Notes:
EPR: elastomeric ethylene-propylene copolymer rubber;

PE: crystalline polyethylene.

[1]Value measured on the polymer composition produced in the first and second reactor;

[2]Value measured on the polymer composition produced in the first, second and third reactor.

The features of the final compositions and the properties of the whole compositions are recorded in Tables 3 and 4, respectively.

TABLE 3

Final Compositions

| | Example | | | | | |
|---|---|---|---|---|---|---|
| | 1 | 2 | 3 | 4 | 1c | 2c |
| Ethylene content, wt % | 23.8 | 22.1 | 25.2 | 22.3 | 15.1 | 12.5 |
| Xylene-soluble fraction, wt % | 22.8 | 21.1 | 22.5 | 22.2 | 28.2 | 28.1 |
| Intrinsic viscosity [η] of xylene-soluble fraction, dl/g | 2.5 | 2.9 | 3.1 | 2.5 | 2.98 | 2.96 |
| EPR/PE weight ratio | 1.5 | 1.9 | 1.4 | 1.8 | — | — |

TABLE 4

Properties of the Whole Compositions

| | | Examples and comparative examples | | | | | |
|---|---|---|---|---|---|---|---|
| | | 1 | 2 | 3 | 4 | 1c | 2c |
| MFR, g/10 min | | 15 | 15 | 12.2 | 13.9 | 14.3 | 14.7 |
| Flexural Modulus, MPa | | 968 | 1075 | 1150 | 895 | 988 | 1150 |
| Izod impact resistance, kJ/m² | at 23° C. | 42.5 | 39 | 39 | 49.9 | 17.2 | 13 |
| | at 0° C. | 12.1 | 11.8 | 11.8 | 16.7 | 11.5 | 9.3 |
| | at −20° C. | 7.1 | 9.1 | 9.1 | 9.2 | 9.2 | 7.5 |
| Whitening resistance: diameter (cm) of the whitening area due to a ram falling from a | 5 cm height | 60 | 70 | 70 | 60 | 90 | 120 |
| | 10 cm height | 80 | 100 | 100 | 90 | 110 | 140 |
| | 20 cm height | 120 | 110 | 110 | 110 | 140 | 150 |
| | 30 cm height | 130 | 130 | 130 | 120 | 170 | 160 |
| | 76 cm height | 160 | 160 | 160 | 150 | 190 | 200 |

The data in the examples show that the compositions according to the present invention exhibit improved whitening resistance, good Izod impact resistance and exhibit relatively low stiffness.

The invention claimed is:

1. A polypropylene composition comprising (percent by weight):
   (a) 50-77% of a crystalline propylene polymer homopolymer having an amount of isotactic pentads (mmmm), measured by $^{13}$C-MNR on the fraction insoluble in xylene at 25° C., higher than 97.5 molar % and a polydispersity index ranging from 4 to 10;
   (b) 13-28% of an elastomeric copolymer of ethylene and propylene, the copolymer having an amount of recurring units deriving from ethylene ranging from 30 to 70% and being partially soluble in xylene at ambient temperature, the polymer fraction soluble in xylene at ambient temperature having an intrinsic viscosity value ranging from 2 to 4 dl/g; and
   (c) 10-22% of a polyethylene homopolymer having an intrinsic viscosity value ranging from 1 to 3 dl/g;
wherein in said composition, the sum of component (b) and component (c) is present in an amount of at least 25 wt % and the weight ratio between copolymer (b) and polyethylene (c) is at least 1.2.

2. The polypropylene composition of claim 1, wherein the crystalline homopolymer (a) is present in an amount ranging from 50 to less than 70%.

3. The polypropylene composition of claim 1, wherein the amount of the elastomeric copolymer (b) ranges from higher than 15 to 28 wt %.

4. The polypropylene composition of claim 1, wherein the amount of the polyethylene (c) ranges from 10 to 20 wt %.

5. The polypropylene composition of claim 1, wherein the total content of copolymerized ethylene is at least 17 wt %.

6. A polymerization process for the preparation of a polypropylene composition comprising (percent by weight):
   (a) 50-77% of a crystalline propylene polymer homopolymer having an amount of isotactic pentads (mmmm), measured by $^{13}$C-MNR on the fraction insoluble in xylene at 25° C., higher than 97.5 molar % and a polydispersity index ranging from 4 to 10;
   (b) 13-28% of an elastomeric copolymer of ethylene and propylene, the copolymer having an amount of recurring units deriving from ethylene ranging from 30 to 70% and being partially soluble in xylene at ambient temperature, the polymer fraction soluble in xylene at ambient temperature having an intrinsic viscosity value ranging from 2 to 4 dl/g; and
   (c) 10-22% of a polyethylene homopolymer having an intrinsic viscosity value ranging from 1 to 3 dl/g;
wherein in said composition, the sum of component (b) and component (c) is present in an amount of at least 25 wt % and the weight ratio between copolymer (b) and polyethylene (c) is at least 1.2, the process comprising polymerizing with a catalyst in at least three sequential polymerization stages wherein the crystalline polymer (a), the elastomeric polymer (b) and the polyethylene (c) are prepared in separate subsequent stages, operating in each stage, except the first stage, in the presence of the polymeric material formed and the catalyst used in the immediately preceding polymerization stage.

7. A polypropylene composition comprising (percent by weight):
   (a) 50-77% of a crystalline propylene homopolymer having an amount of isotactic pentads (mmmm), measured by $^{13}$C-MNR on the fraction insoluble in xylene at 25° C., higher than 97.5 molar % and a polydispersity index ranging from 4 to 10;
   (b) 13-28% of an elastomeric copolymer of ethylene and propylene, the copolymer having an amount of recurring units deriving from ethylene ranging from 35 to 60% and being partially soluble in xylene at ambient temperature, the polymer fraction soluble in xylene at ambient temperature having an intrinsic viscosity value ranging from 2 to 4 dl/g; and
   (c) 10-22% of a polyethylene homopolymer having an intrinsic viscosity value ranging from 1 to 3 dl/g;

wherein in said composition, the sum of component (b) and component (c) is present in an amount of at least 25 wt %, and the weight raio between copolymer (b) and polyethylene (c) is at least 1.2.

8. The polypropylene composition of claim 7 having a melt flow rate from 10 to 30.